(12) United States Patent
Li

(10) Patent No.: US 7,760,495 B2
(45) Date of Patent: Jul. 20, 2010

(54) MOUNTING APPARATUS FOR DATA STORAGE DEVICE

(75) Inventor: Zhan-Yang Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 358 days.

(21) Appl. No.: 11/872,048

(22) Filed: Oct. 15, 2007

(65) Prior Publication Data
US 2009/0103277 A1 Apr. 23, 2009

(30) Foreign Application Priority Data
Sep. 20, 2007 (CN) .................... 2007 2 0201047 U

(51) Int. Cl.
*H05K 5/00* (2006.01)
*H05K 7/00* (2006.01)
(52) U.S. Cl. ................................. 361/679.37
(58) Field of Classification Search ............ 361/679.33, 361/679.37
See application file for complete search history.

(56) References Cited

U.S. PATENT DOCUMENTS

| 6,728,109 | B1 | 4/2004 | Wu | |
|---|---|---|---|---|
| 6,813,148 | B2 * | 11/2004 | Hsu et al. | ............... 361/679.39 |
| 7,061,756 | B2 | 6/2006 | Wu | |

* cited by examiner

Primary Examiner—Jayprakash N Gandhi
Assistant Examiner—Anthony M Haughton
(74) Attorney, Agent, or Firm—Frank R. Niranjan

(57) ABSTRACT

A mounting apparatus for a data storage device (50) includes a bracket (10) for receiving the data storage device therein, a sliding member (20) resiliently attached to the bracket via a spring (40), and a latch member (30) rotatably attached to the bracket for preventing disengagement of the sliding member from the bracket. The data storage device has at least a stud (54) protruding out of a sidewall thereof. The sliding member is movable between a first position in which the spring is at an original state and the sliding member locks the stud of the data storage device, and a second position in which the spring is at a depressed state and the sliding member unlocks the stud of the data storage device.

20 Claims, 5 Drawing Sheets

MOUNTING APPARATUS FOR DATA STORAGE DEVICE

BACKGROUND

1. Technical Field

The present invention relates to mounting apparatuses, and more particularly to a mounting apparatus for data storage devices.

2. General Background

Various data storage devices are installed in computers for communication and handling of data. Such devices include, for example, hard disk drives, floppy disk drives, and CD-ROM drives.

A conventional data storage device is directly attached to a computer enclosure with bolts. However, attachment with bolts is unduly complicated and time-consuming Thus screwless mounting means for data storage devices are developed. For example, an anchoring apparatus for computer drives without using screws includes an anchor plate coupling on two struts located on an installation rack of the drives. The anchor plate pivotally and respectively engages with an actuating member on the left side and the right side through stub shafts. The anchor plate has anchor stubs corresponding to anchor holes of the installation rack. Each strut is coupled with a returning spring. The actuating member has a driving lever on an outer side and an inner side extended to form a driven end. The driving lever may be moved to a returning position thereby to replace and install the drive without disassembling screws. However, the structure of the anchoring apparatus is complicated. Furthermore, assembly and disassembly of the anchoring apparatus is cumbersome and time-consuming.

What is needed, therefore, is a mounting apparatus for data storage devices with simplified configuration of which assembly or disassembly is easy.

SUMMARY

A mounting apparatus for a data storage device includes a bracket for receiving the data storage device therein, a sliding member resiliently attached to the bracket via a spring, and a latch member rotatably attached to the bracket for preventing disengagement of the sliding member from the bracket. The data storage device has at least a stud protruding out of a sidewall thereof. The sliding member is movable between a first position in which the spring is at an original state and the sliding member locks the stud of the data storage device, and a second position in which the spring is at a depressed state and the sliding member unlocks the stud of the data storage device.

Other advantages and novel features will be drawn from the following detailed description of preferred embodiments with attached drawings, in which:

DETAILED DESCRIPTION

Figure 1:
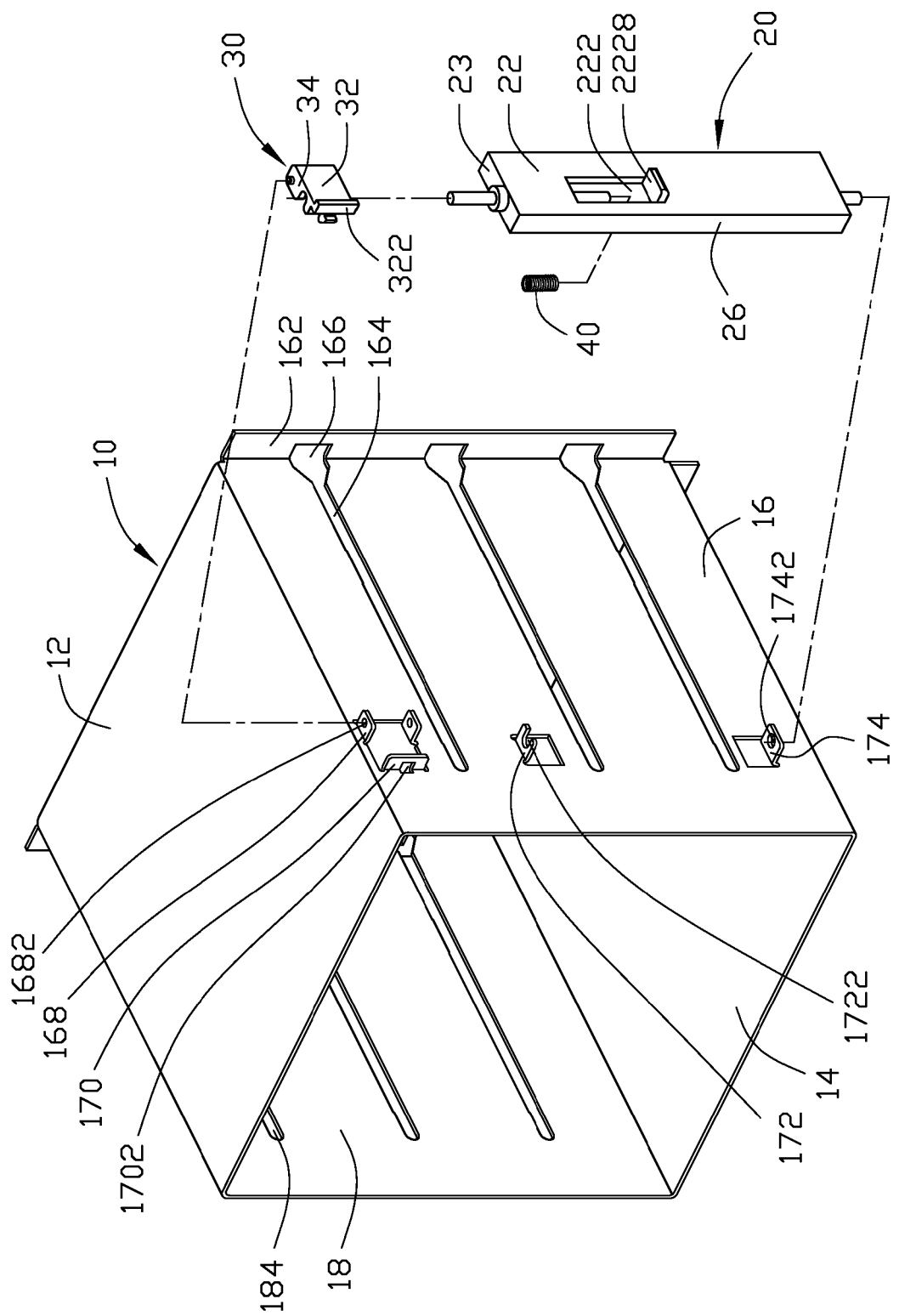
FIG. 1 is an exploded, isometric view of a mounting apparatus for data storage devices of a preferred embodiment of the present invention, the mounting apparatus including a bracket, a sliding member, a latch member, and a spring.

Referring to FIG. 1, a mounting apparatus of an embodiment of the present invention includes a bracket 10, a sliding member 20, a latch member 30, and a spring 40.

Figure 2:
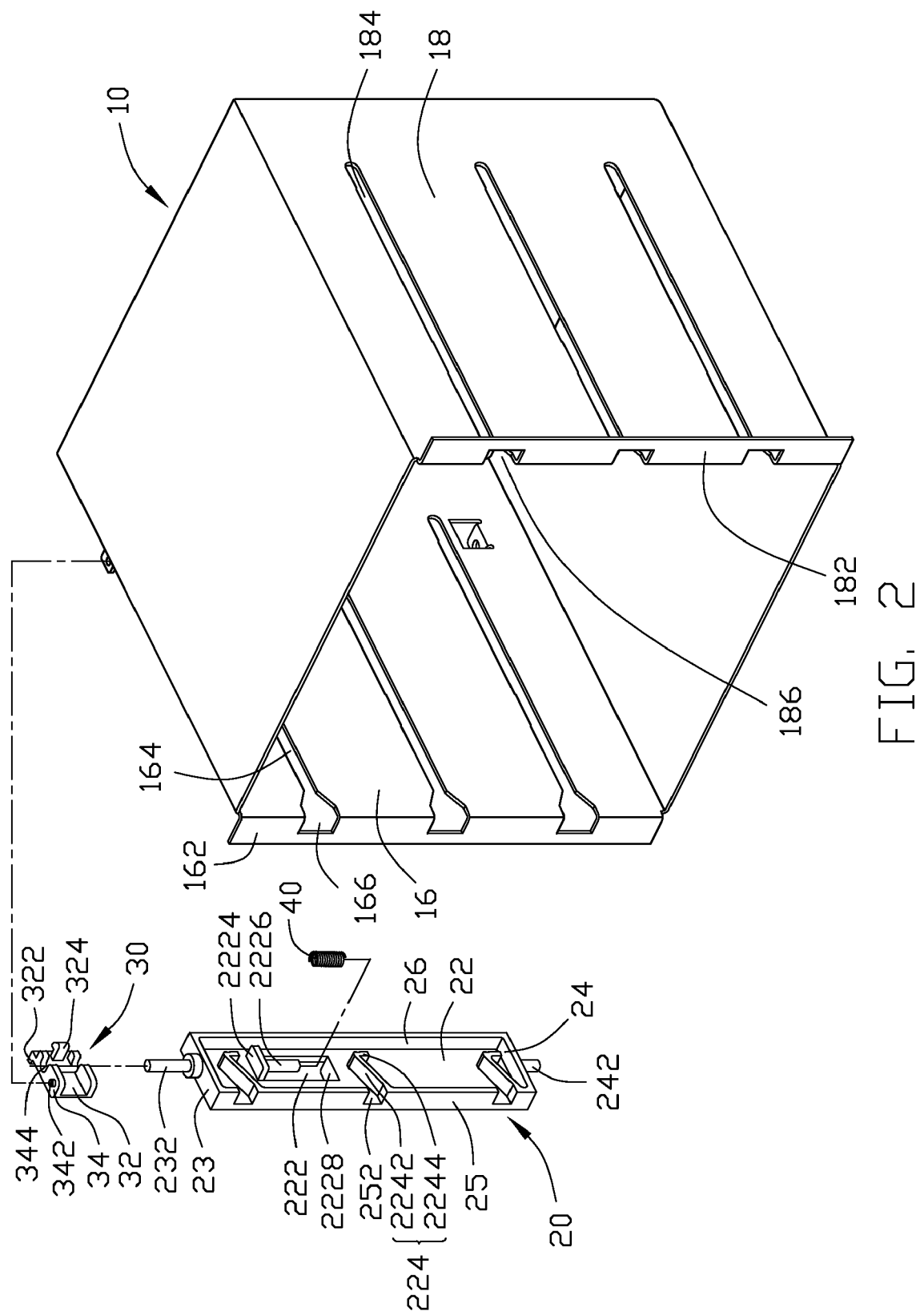
FIG. 2 is similar to FIG. 1, but viewed from another aspect.

Referring to FIGS. 1 and 2, the bracket 10 includes a top panel 12, a bottom panel 14 parallel to the top panel 12, and a pair of parallel side panels 16, 18 perpendicularly connecting between the top panel 12 and the bottom panel 14. A pair of front flanges 162, 182 is perpendicularly and outwardly extending from front edges of the side panels 16, 18 respectively. A plurality of sliding slots 164, 184 is defined in the side panels 16, 18 respectively along a direction parallel to the top panel 12. A plurality of front entrances 166, 186 is respectively defined in the front flanges 162, 182 and communicating with the sliding slots 164, 184. A pair of parallel protruding pieces 168 extends perpendicularly and outwardly from the side panel 16 and is located above a rear portion of a top sliding slot 164. Each of the protruding pieces 168 has a pivot hole 1682 defined therein. A latch piece 170 behind the protruding pieces 168 extends perpendicularly from the side panel 16. The latch piece 170 is perpendicular to the protruding pieces 168 and parallel to the front flange 162 of the side panel 16. A notch 1702 is defined in the latch piece 170. A support piece 172 extends perpendicularly from the side panel 16 above a rear portion of an intermediate sliding slot 164. A cutout 1722 is defined in an outer end of the support piece 172. A mounting piece 174 extends from the side panel 16 below a rear portion of a bottom sliding slot 164. A mounting hole 1742 is defined in the mounting piece 174.

The sliding member 20 includes a rectangular body panel 22 parallel to the side panels 16, 18 of the bracket 10, and a top flange 23, a bottom flange 24, a pair of side flanges 25, 26 perpendicularly extending from four edges of the body panel 22 thereof towards the side panel 16 of the bracket 10. A rectangular opening 222 is defined in the body panel 22 of the sliding member 20. A resisting piece 2224 extends perpendicularly and inwardly from a top edge of the opening 222. A column 2226 extends perpendicularly and downwardly from the resisting piece 2224 for attaching the spring 40 thereto. A height of the column 2226 is less than a length of the opening 222. An operating tab 2228 extends perpendicularly and outwards from a bottom edge of the opening 222 of the body panel 22. The sliding member 20 further includes a plurality of stops 224 extending from the side flange 25 thereof. Each of the stops 224 includes a slope 2242 extending aslant and upwards from a bottom edge of a gap 252 of the side panel 25, and a vertical block piece 2244 extending downwards from a topmost edge of the slope 2242. A top post 232 and a bottom post 242 extend from the top flange 23, and the bottom flange 24 of the sliding member 20, respectively.

The latch member 30 includes a base panel 32, and a pair of pivot flanges 34 extending perpendicularly from upper and lower edges of the base panel 32 respectively. A pivot post 342 is formed on each of the pivot flanges 34, corresponding to the pivot hole 1682 of the side panel 16 of the bracket 10. An arc-shaped gap 344 is defined in each of the pivot flanges 34. A protruding flange 322 is formed at a side edge of the base panel 32. A hook 324 extends from the base panel 32 and is adjacent to the protruding flange 322, corresponding to the notch 1702 of the latch piece 170 of the bracket 10.

Figure 3:
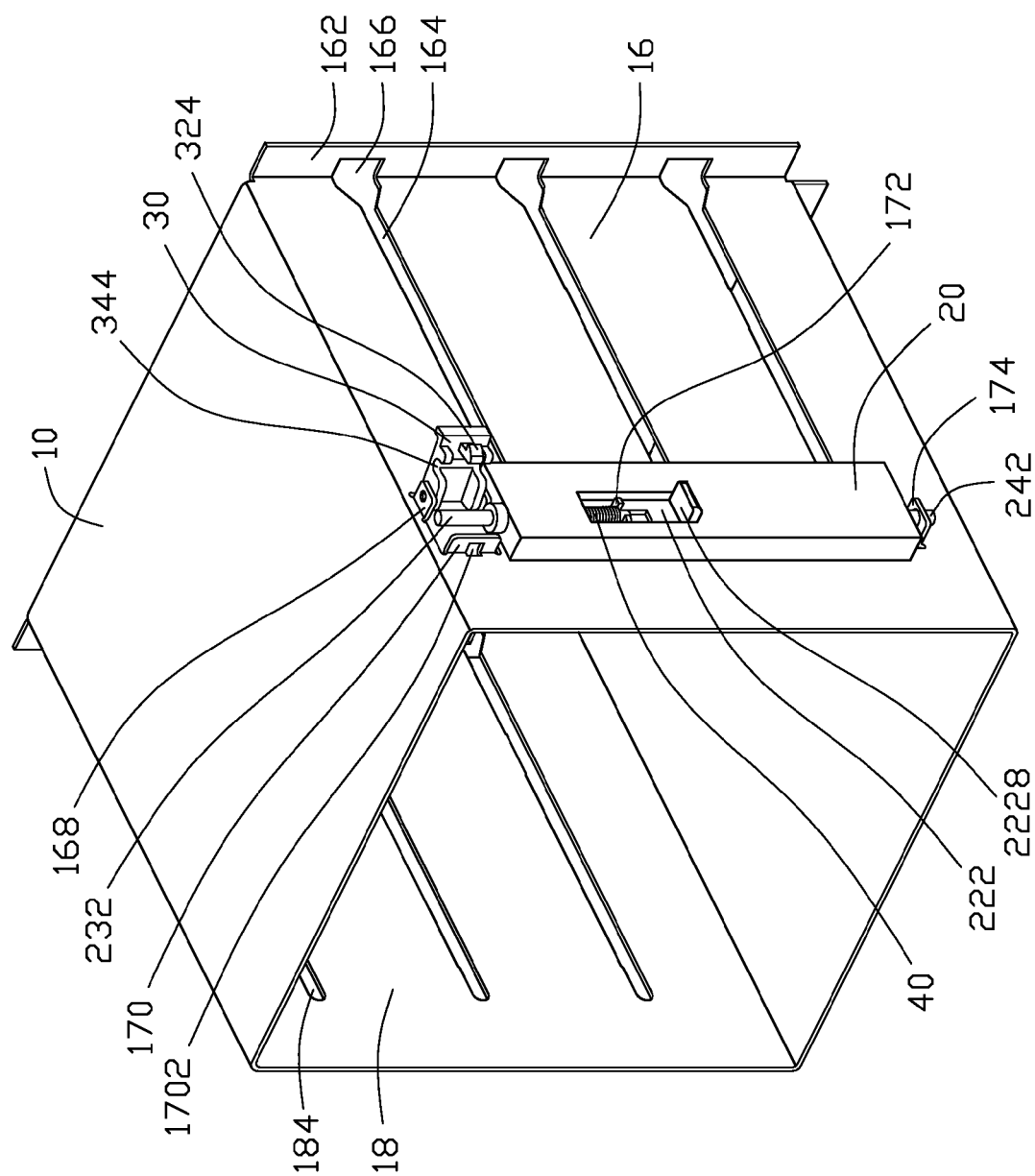
FIG. 3 an assembled view of FIG. 1, showing the latch member in an unsecured position.
Figure 4:
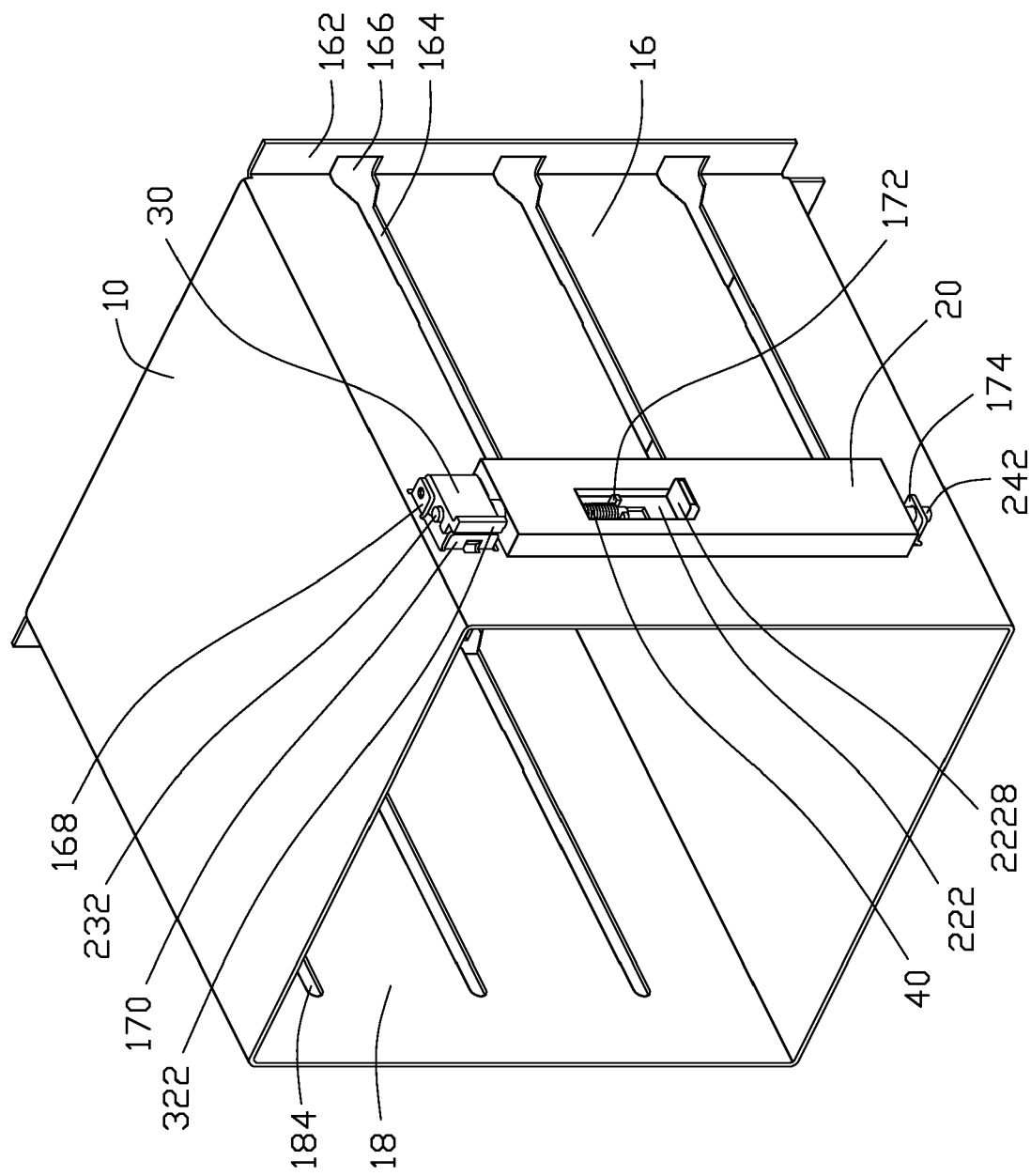
FIG. 4 is similar to FIG. 3, but showing the latch member in a secured position.

Referring to FIGS. 3 and 4, in assembly, the pivot posts 342 of the latch member 30 are engaged in the pivot holes 1682 of the protruding pieces 168 of the side panel 16 of the bracket 10 to pivotably mount the latch member 30 to the side panel 16 of the bracket 10.

The bottom post 242 of the sliding member 20 is inserted in the mounting hole 1742 of the mounting piece 174 of the side panel 16 of the bracket 10. The top post 232 of the sliding member 20 is located between the protruding pieces 168 and the latch piece 170 of the side panel 16 of the bracket 10. The spring 40 is attached to the column 2226 of the sliding member 20. An upper end of the spring 40 abuts against the resisting piece 2224 of the sliding member 20. A free end of the spring 40 abuts against the support piece 172 of the side panel 16 of the bracket 10. A lower end of the column 2226 is engaged in the cutout 1722 of the support piece 172 of the bracket 10. The sliding member 20 is supported by a spring force of the spring 40. The bottom flange 24 of the sliding member 20 does not reach the mounting piece 174 of the bracket 10 for allowing downward movement of the sliding member 20. Then, the latch member 30 is rotated to a locked position where the hook 324 of the latch member 30 is engaged in the notch 1702 of the latch piece 170 of the bracket 10, and the top post 232 of the sliding member 20 is engaged in the gaps 344 of pivot flanges 34 of the latch member 30. Then, the sliding member 20 is attached to the side panel 16 of the bracket 10 at an original position in which the stops 224 of the latch member 20 align with the sliding slots 164 of the side panel 16 of the bracket 10 respectively. The spring 40 has an original length.

Figure 5:
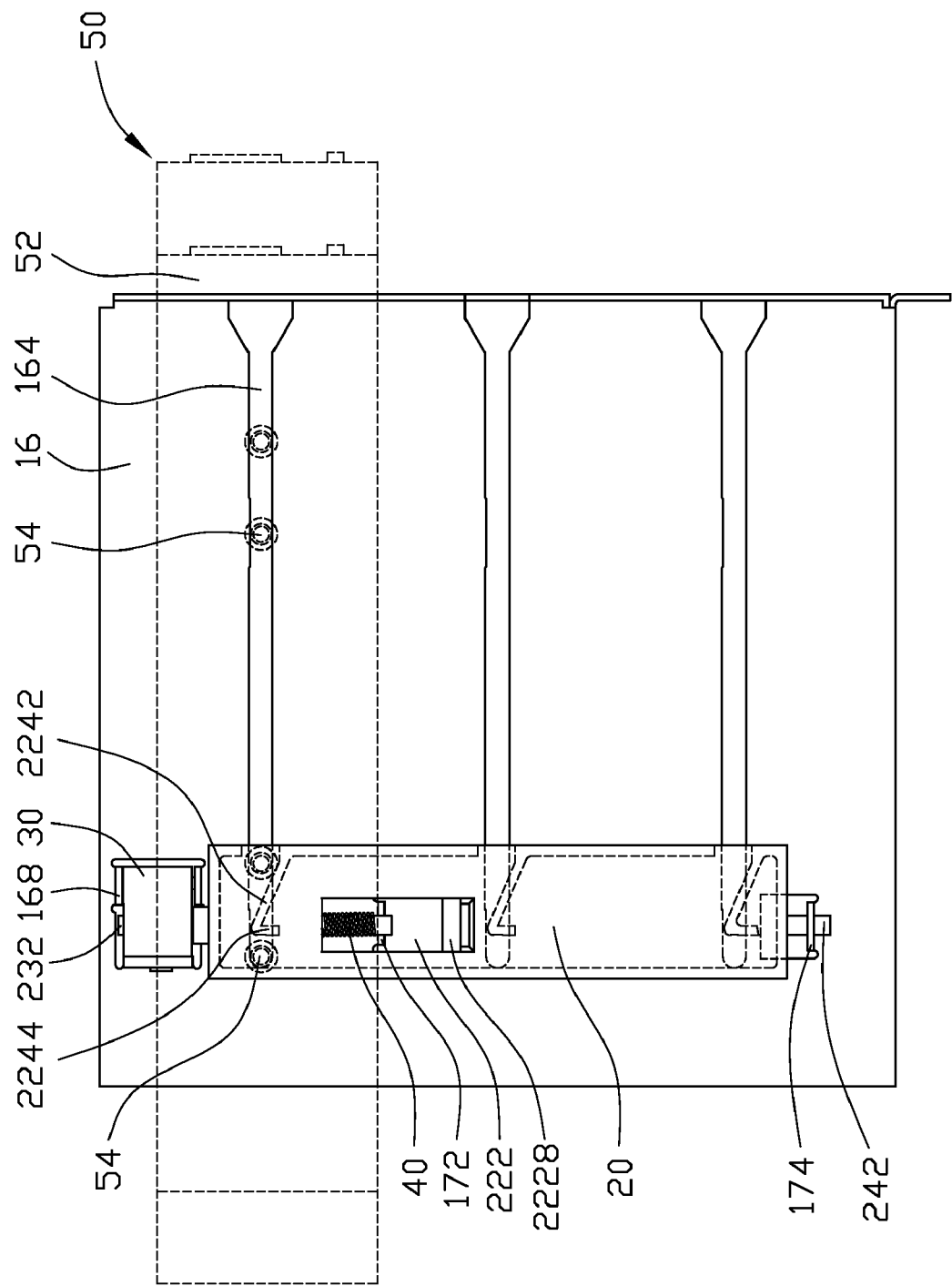
FIG. 5 is an assembled view of the mounting apparatus of FIG. 4 and a data storage device, showing the data storage device in a locked position and an unlocked position.

Referring also to FIG. 5, a data storage device 50 has a sidewall 52 with front and rear studs 54 protruding therefrom. In assembly of the data storage device 50, the studs 54 are received in and slid along the upper sliding slot 164 of the bracket 10 from a front-to-back direction. The rear stud 54 of the data storage device 50 is slid on a slope 2242 of an upper stop 224 of the sliding member 20 from the gap 252 of the sliding member 20 until the rear stud 54 reaches the topmost edge of the slope 2242 to depress the sliding member 20 to a depressed position in which each of the stops 224 of the sliding member 20 is below the corresponding sliding slot 164 of the bracket 10. The spring 40 has a depressed length at this time. Then, the rear stud 54 is slid to a rear end of the upper sliding slot 164 of the bracket 10, no longer depressing the sliding member 20. Thus, the spring 40 rebounds upwards to elevate the sliding member 20 to the original position. The rear stud 54 is blocked by the block piece 2244 of the upper stop 224 of the sliding member 20. Thus, the data storage device 50 is fixed in the bracket 10.

In disassembly of the data storage device 50, the operating tab 2228 of the sliding member 20 is pressed downwards to move the sliding member 20 to the depressed position where the upper stop 224 of the sliding member 20 is below the upper sliding slot 164 of the bracket 10 to release the rear stud 54 of the data storage device 50. Then the studs 54 are slid along the upper sliding slot 164 from a back-to-front direction, and the data storage device 50 is pulled out from the bracket 10.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting apparatus for a data storage device, comprising:
    a bracket for receiving the data storage device therein, comprising a side panel and a pair of protruding pieces extending from the side panel, each of the protruding pieces having a pivot hole defined therein;
    a latch member having a pair of pivot posts pivotably engaged in the pivot holes of the protruding pieces and rotatably attached to the side panel of the bracket; and
    a sliding member attached to an outside of the bracket for locking the data storage device in the bracket, one end of the sliding member movably coupled to the side panel of the bracket, another end of the sliding member movably engaged between the latch member and the side panel of the bracket.

2. The mounting apparatus as described in claim 1, wherein a mounting piece extends from the side panel of the bracket and defines a mounting hole therein, and a first post formed at said one end of the sliding member is engaged in the mounting hole and movable in the mounting hole along a direction toward the mounting piece.

3. The mounting apparatus as described in claim 2, wherein the latch member is rotatable to a latched position where the latch member is secured to the bracket, and a second post formed at said another end of the sliding member is movably engaged between the latch member and the side panel of the bracket.

4. The mounting apparatus as described in claim 3, wherein the latch member comprises a pair of pivot flanges perpendicular to the side panel of the bracket, and a gap is defined in each of the pivot flanges for receiving said another post of the sliding member therein.

5. The mounting apparatus as described in claim 1, further comprising a spring with one end resisting against the sliding member, a support piece extending perpendicularly from the side panel of the bracket resists against another end of the spring.

6. The mounting apparatus as described in claim 5, wherein the sliding member comprises a body panel adjacent and parallel to the side panel of the bracket, a resisting piece being formed at an inner side of the sliding member for resisting against said one end of the spring, and a column extending perpendicularly from the resisting piece for attaching the spring thereto.

7. The mounting apparatus as described in claim 6, wherein the sliding member further comprises at least a stop formed at the inner side thereof for locking the data storage device in the bracket.

8. The mounting apparatus as described in claim 7, wherein the stop comprises a slope and a block piece extending downwards from a topmost edge of the slope for locking a stud of the data storage device.

9. The mounting apparatus as described in claim 8, wherein the sliding member is resiliently movable between a first position in which the stop of the sliding member is at an original height for locking the data storage device, and a second position in which the stop of the sliding member is at a depressed height for unlocking the data storage device.

10. A mounting assembly, comprising:
    a data storage device with at least a stud fixed at a sidewall thereof;
    a bracket for receiving the data storage device therein, the bracket comprising a side panel, a slot being defined in the side panel along a first direction for slidably receiving the stud of the data storage device therein;

a sliding member attached to the side panel of the bracket and movable along a second direction substantially perpendicular to the first direction, the sliding member comprising a stop for engaging with the stud of the data storage device; and a latch member rotatably attached to the side panel of the bracket and engaged with one end of the sliding member for preventing disengagement of the sliding member from the bracket;

wherein the sliding member is movable between a first position in which the stop of the sliding member aligns with the slot of the bracket to block the stud of the data storage device, and a second position in which the sliding member is depressed and the stop of the sliding member is below the slot of the bracket to release the stud of the data storage device; the latch member comprises a base panel spaced apart from the side panel of the bracket, one end of the sliding member is movably engaged between the base panel and the side panel of the bracket; and a pair of flanges extends respectively from upper and lower edges of the base panel of the latch member, and each defines a gap therein for engaging with said one end of the sliding member.

11. The mounting assembly as described in claim 10, wherein a mounting piece extends perpendicularly from the side panel of the bracket and defines a mounting hole therein, a bottom post formed at another end of the sliding member is engaged in the mounting hole, and a top post formed at said end of the sliding member is engaged between the side panel of the bracket and the latch member.

12. The mounting assembly as described in claim 11, wherein the sliding member comprises a body panel, a top flange and a bottom flange extend perpendicularly from top and bottom edges of the body panel towards the side panel of the bracket respectively, said top post protrudes from the top flange, and said bottom post protrudes from the bottom flange.

13. The mounting assembly as described in claim 12, wherein the bottom flange of the sliding member is spaced from the mounting piece of the bracket in the first position for allowing the sliding member to move to the second position.

14. The mounting assembly as described in claim 10, further comprising a spring with a top end resisting against the sliding member, a support piece extending from the side panel of the bracket resists against a bottom end of the spring for resiliently supporting the sliding member.

15. The mounting assembly as described in claim 10, wherein the stop of the sliding member comprises a slope and a block piece extends from a topmost edge of the slope for abutting against the stud of the data storage device in the first position.

16. A mounting assembly, comprising:
a bracket comprising a side panel, a pair of protruding pieces extending from the side panel, each of the protruding pieces having a pivot hole defined therein, and the side panel having a horizontal slot defined therein;
a data storage device received in the bracket, the data storage device having a protrusion slidably engaged in the horizontal slot;
a sliding member coupled to an outside of the side panel of the bracket opposite to the data storage device, the sliding member having a locking portion for lockingly engaged with the protrusion of the data storage device, the sliding member being movable between a first position where the locking portion lockingly engages with the protrusion of the data storage device, and a second position where the locking portion of the sliding member is moved away from and disengages with the protrusion of the data storage device;
a latch member attached to the side panel of the bracket and rotatable to a final position where the latch member is secured to the bracket, and one end of the sliding member is movably engaged between the latch member and the side panel of the bracket, the latch member comprising a pair of pivot posts engaged in the pivot holes of the protruding pieces for pivotably attaching the latch member to the bracket and a hook latchably secured to the bracket for securing the latch member in the final position; and
a spring member mounted between the side panel and the sliding member, for urging the sliding member to move from the second position to the first position.

17. The mounting assembly as described in claim 16, wherein a mounting piece extends from the side panel of the bracket and defines a mounting hole therein, another end of the sliding member is movably engaged in the mounting hole.

18. The mounting assembly as described in claim 16, wherein the locking portion of the sliding member comprises a slope for facilitating sliding movement of the protrusion of data storage device, and a block piece extending from a topmost edge of the slope for abutting the protrusion of the data storage device at the first position.

19. The mounting assembly as described in claim 16, wherein the latch member comprises a base panel that is spaced apart from the side panel of the bracket, said one end of the sliding member is movably engaged between the base panel and the side panel of the bracket; and a pair of flanges extends respectively from upper and lower edges of the base panel of the latch member and each defines a gap therein for engaging with said one end of the sliding member.

20. The mounting assembly as described in claim 19, wherein the pivot posts extend from the flanges of the latch member respectively, and the flanges of the latch member are sandwiched between the protruding pieces of the bracket.

* * * * *